United States Patent [19]

Makino et al.

[11] Patent Number: 4,735,247
[45] Date of Patent: Apr. 5, 1988

[54] BASE-CAP TREAD

[75] Inventors: Shigeo Makino, Tokorozawa; Norio Iwata, Amagi, both of Japan

[73] Assignee: Bridgestone Corporation, Tokyo, Japan

[21] Appl. No.: 804,960

[22] Filed: Dec. 5, 1985

[30] Foreign Application Priority Data

Dec. 5, 1984 [JP] Japan .................. 59-255817

[51] Int. Cl.$^4$ .............................................. B60C 1/00
[52] U.S. Cl. ................................................ 152/209 R
[58] Field of Search ........... 152/209 R, 209 D, 209 B, 152/532, 450

[56] References Cited

U.S. PATENT DOCUMENTS

| 4,274,462 | 6/1981 | Ogawa et al. | 152/209 R |
| 4,407,346 | 10/1983 | Bandel et al. | 152/209 R |
| 4,588,009 | 5/1986 | Kitazawa et al. | 152/209 R |
| 4,603,721 | 8/1986 | Kogure et al. | 152/209 |

Primary Examiner—Michael Ball
Attorney, Agent, or Firm—Sughrue, Mion, Zinn, Macpeak & Seas

[57] ABSTRACT

A pneumatic tire having a tread of a lug type pattern is disclosed. In this type of the tire, the tread rubber has a composite structure of a cap rubber and a base rubber having a heat build-up property lower than that of the cap rubber and arranged on at least a shoulder portion of the tread just beneath the cap rubber. The base rubber has a thickness that an average thickness just beneath the lug is larger than that just beneath the lug groove in a conical plane imaged by taking as a general line a normal line drawn from the tread end to the inner surface of the tire in the radial section inclusive of a rotational axis of the tire.

9 Claims, 2 Drawing Sheets

BASE-CAP TREAD

BACKGROUND OF THE INVENTION

1. Field of the Invention

This invention relates to pneumatic tires for use in heavy vehicles such as truck, bus and the like, and more particularly to pneumatic radial tires of this type having a tread of a cap and base structure.

2. Related Art Statement

In the tread reinforced with a belt as in the radial tire, a so-called cap and base structure is often used in order to enhance the durability of the belt. In this connection, rubber having an excellent resistance to heat build-up is used as the base rubber, which exhibits an effect on the durability of the belt and contributes to reduce fuel consumption through the reduction of the rolling resistance of tire.

Even without the necessity of listing references, there has hitherto been well-known the cap and base structure in the tire tread, wherein rubber having an excellent resistance to head build-up serves as a base rubber together with a cap rubber to increase the durability of the belt.

However, when the cap and base structure is applied to a tread of a lug type pattern suitable for running on a poor surface, it becomes apparent that a sufficient effect for preventing separation failure at belt ends beneath the lug is not necessarily obtained. Also, since the base rubber is generally weak to cutting and the growth of cut crack is generally fast in the base rubber, cut failure in the tread center, primarily subjected to cuts in the above application, is counted as one of the defects of the cap and base structure.

SUMMARY OF THE INVENTION

It is an object of the invention to propose a novel improvement of the cap and base structure suitable for the lug type tread pattern and capable of sufficiently contributing to the prevention of separation failure at belt end.

According to the invention, there is the provision of a pneumatic tire comprising a carcass toroidally extending between both left and right bead portions and a belt and a tread rubber surrounding a crown portion of the carcass, the tread having a lug type pattern formed by circumferentially dividing the tread into lugs by lug grooves, wherein:

said tread rubber has a composite structure of a cap rubber extending substantially over a whole zone of the tread width and a base rubber having a heat build-up property lower than that of the cap rubber and arranged on at least a shoulder portion of the tread just beneath said cap rubber; and said base rubber has such a thickness that an average thickness just beneath said lug is larger than that just beneath said lug groove in a conical plane imaged by taking as a general line a normal line drawn from the tread end to the inner surface of the tire in the radial section inclusive of a rotational axis of the tire.

In the preferred embodiments of the invention, the ratio of the average thickness just beneath the lug to that just beneath the lug groove is 1.1–3.0, the base rubber is provided at the outer surface with a waveform having maximum and minimum thicknesses h max, h min just beneath the substantially center portions of the lug and lug groove, respectively, the ratio of the maximum thickness to the minimum thickness is 1.5–5.0, and the base rubber is arranged at a width corresponding to 15–50% of the tread width around the normal line drawn from the tread end to the inner surface of the tire in the radial section inclusive of a rotational axis of the tire as a center line.

In the further embodiments of the invention, the cap rubber and the base rubber have Shore A hardnesses of 55–62 and 58–64, respectively, and more preferably the ratio thereof is 1.00–1.06. Similarly, they have moduli at 100% elongation of 18–28 and 27–33, respectively, and more desirably, the ratio thereof is 1.1–1.5.

DESCRIPTION OF THE PREFERRED EMBODIMENTS

The invention will be described in detail with reference to the accompanying drawings.

Figure 1:
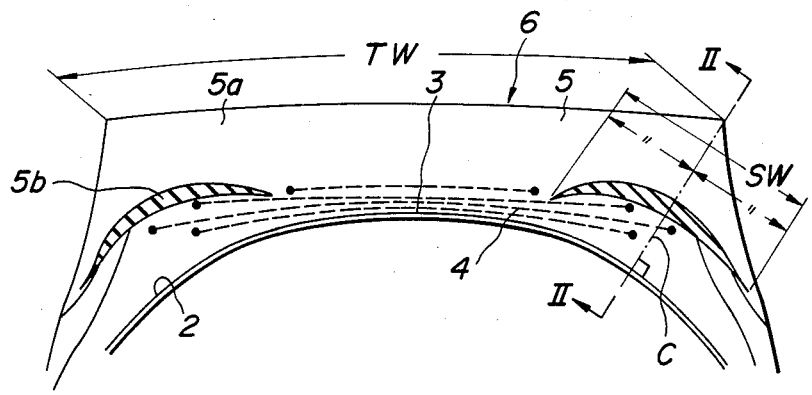
FIG. 1 is a schematically radial section view of a main part of the pneumatic tire according to the invention.
Figure 2:
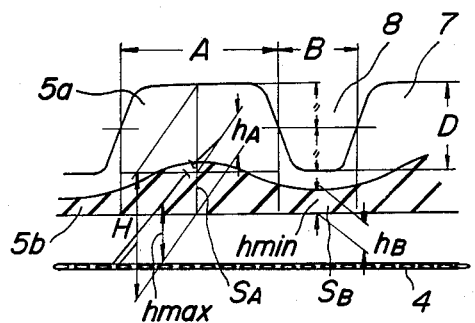
FIG. 2 is a partly sectional view taken along a line II—II of FIG. 1.
Figure 3:
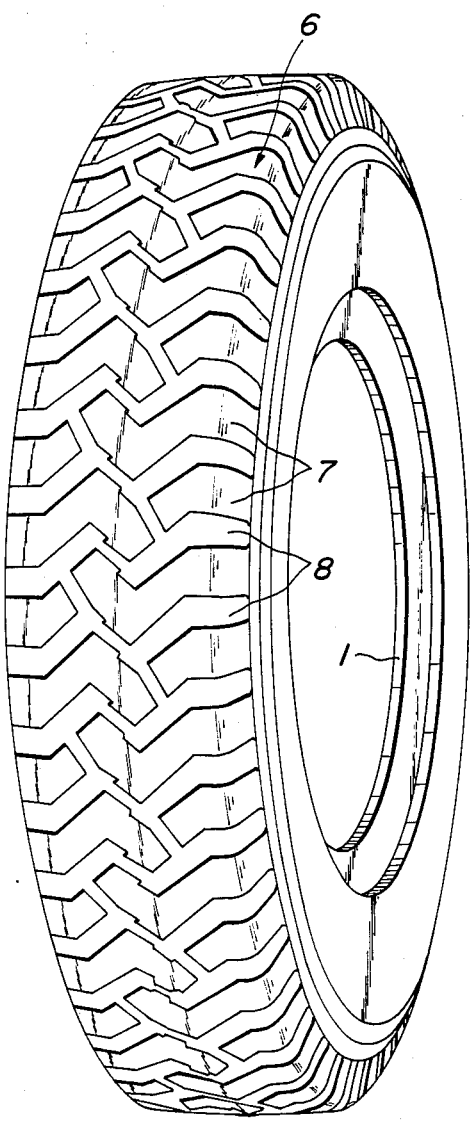
FIG. 3 is a perspective view of the pneumatic tire according to the invention.

In FIG. 1 is partially illustrates a TBR tire having a tire size of 12.00 R 24 according to the invention. FIG. 2 is a sectional view taken along a line II—II of FIG. 1 and FIG. 3 shows the external appearance of the tire of FIG. 1.

In these figures, numeral 1 is a bead portion, numeral 2 a carcass, numeral 3 a crown portion of the carcass, numeral 4 a belt, numeral 5 a tread rubber, numeral 6 a tread, numeral 7 a lug and numeral 8 a lug groove.

The tread rubber 5 is composed of a cap rubber 5a and a base rubber 5b. The cap rubber 5a is extended substantially over a whole width TW of the tread, while the base rubber 5b is arranged on at least a shoulder portion of the tread just beneath the cap rubber 5a, and particularly blended so as to exhibit a low heat build-up property.

The base rubber 5b is preferably arranged at a width SW corresponding to 15–50% of the tread width TW around a normal line drawn from the end of the tread 6 to the inner surface of the tire in the radial section inclusive of a rotational axis of the tire as shown in FIG. 1, preferably the normal line using as a center line. Incidentally, in the round type tread, the position of the tread edge is determined by a point of intersection between a prolongation of the tread 6 and a prolongation of the outer surface of the sidewall portion.

The base rubber 5b has such a thickness that an average thickness $h_A$ measured beneath the lug is larger than an average thickness $h_B$ measured just beneath the lug groove in the section taken along a line II—II of FIG. 1 or in a conical plane c imaged by taking a normal line drawn from the tread end to the inner surface of the tire as a general line. The ratio of $h_A/h_B$ is 1.1–3.0, preferably 1.5–2.5. In this case, the average thickness $h_A$ is a value obtained by dividing the sectional area $S_A$ of the base rubber 5b beneath the lug by the width A of the lug 7 as shown in the section of FIG. 2. Also, the average thickness $h_B$ can be obtained according to the same manner. The width SW of the base rubber 5b illustrated in the section of FIG. 1 is approximately uniform in the circumferential direction.

Thus, the volume of the base rubber per unit length on the circumference of the tire is larger beneath the lug than beneath the lug groove, which can effectively prevent the separation failure at belt end beneath the lug.

The outer surface of the base rubber 5b illustrated in FIG. 2 has preferably a waveform having a maximum thickness $h_{max}$ and minimum thickness $h_{min}$ just beneath the substantially center portions of the lug 7 and lug groove 8, respectively, and a ratio of $h_{max}/h_{min}$ of 1.5–5.0, more preferably 2.0–4.0 in view of the balance of the base rubber. Further, the ratio of the width B of the lug groove 8 to the width A of the lug 7 and the ratio of the depth D of the lug groove 8 to the same width A are practically 0.3–0.8 and 0.2–0.5, respectively.

Figure 4:
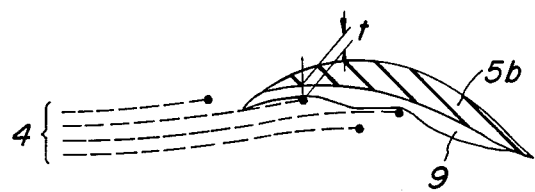
FIG. 4 is a schematically sectional view of a main part illustrating the rubber stock arrangement.

Moreover, between the base rubber 5b and the end of the belt 4 is arranged a rubber stock 9 as shown in FIG. 4. The rubber stock 9 has preferably a modulus substantially equal to that of a belt coating rubber. As shown in FIG. 4, the rubber stock 9 serves to separate the cord ends of the belt 4 from the base rubber 5b at a distance t of at least 1 mm, preferably not more than 3 mm, whereby the influence of the separation failure at the cord ends of the belt 4 is avoided on the base rubber 5b wherein cracks are apt to be caused and considerably grow owing to the low heat build-up property.

The following example is given in illustration of the invention and is not intended as a limitation thereof.

In the heavy duty radial tire of TBR 12.00 R 24 as shown in FIGS. 1–3, the ratio of the width B of the lug groove 8 to the width A of the lug 7 was 0.47 and the ratio of the depth D of the lug groove 8 to the same width A was 0.32. On the other hand, the base rubber 5b having a width SW corresponding to 37% of the tread width TW was arranged on the shoulder portion just beneath the cap rubber 5a so that the ratio of the maximum thickness $h_{max}$ beneath the lug to the minimum thickness $h_{min}$ beneath the lug groove was 2.1, wherein the average thickness $h_A$ beneath the lug was 1.8 times the average thickness $h_B$ beneath the lug groove.

In this case, the total gauge H of the cap and base rubbers in the lug was 33 mm and the rubber stock 9 was arranged so that the cord ends of the belt 4 were separated from the base rubber 5b at a distance of 1.3 mm.

The Shore A hardness was 60 in the cap rubber, 62 in the base rubber and 70 in the rubber stock, while the modulus at 100% elongation was 24 kg/cm², 30 kg/cm² and 60 kg/cm², respectively, in this order of these rubbers.

With respect to such a test tire, the durability of the belt was examined by an indoor drum as a result it was confirmed that according to the invention, the durability was increased by at least 30% as compared with the control tire having a cap and base structure in which the base rubber of uniform thickness was arranged on the circumference of tire.

According to the invention, when the tread of the cap and base structure is applied to a pneumatic tire having a lug type pattern particularly suitable for use on a bad road, the prevention of the separation failure at belt end, which has hitherto been insufficient in the conventional tire, and the occurrence and growth of cracks resulted therefrom can advantageously and surely be realized. And also, there is no fear on cut failure when the base rubber is not arranged beneath the tread center portion.

What is claimed is:

1. A pneumatic tire comprising:
    a carcass toroidally extending between both left and right bead portions,
    a belt having a coating rubber, and
    a tread rubber surrounding a crown portion of the carcass, a tread having a lug type pattern formed by circumferentially dividing the tread into the lugs by lug grooves, said tread rubber having a composite structure of a cap rubber extending substantially over the entire zone of the tread and a base rubber having a heat build-up property lower than that of the cap rubber,
    said base rubber arranged on at least a shoulder of the tread just beneath said cap rubber, said base rubber having a thickness that an average thickness just beneath said lug is larger than that just beneath said lug groove in a radial plane containing a normal line drawn from the tread end to the inner surface of the tire and passing through a rotational axis of the tire,
    said base rubber arranged at a width corresponding to 15–50% of the tread width around a normal line drawn from the tread end to the inner surface of the tire in the radial section inclusive of a rotational axis of the tire as a center line, and
    a rubber stock having a modulus substantially equal to that of the belt coating rubber and arranged between said base rubbers and each end of said belt.

2. The pneumatic tire according to claim 1, wherein a ratio of the average thickness just beneath the lug to that just beneath the lug groove is 1.1–3.0.

3. The pneumatic tire according to claim 1, wherein said base rubber is provided at the outer surface with a waveform having maximum and minimum thicknesses just beneath the substantially center portions of the lug and the lug groove, respectively, and a ratio of the maximum thickness to the minimum thickness of 1.5–5.0.

4. The pneumatic tire of claim 1, wherein the cap rubber and the base rubber have a Shore A hardness ratio of 1.00–1.06.

5. The pneumatic tire of claim 4, wherein the cap rubber has a Shore A hardness in the range of 55–62 and the base rubber a Shore A hardness in the range of 58–64.

6. The pneumatic tire of claim 1, wherein said cap rubber and said base rubber have moduli at 100% elongation in a ratio of 1.1–1.5.

7. The pneumatic tire of claim 6, wherein said cap rubber has a 100% modulus of elongation in the range of 18–28 and said base rubber has a 100% modulus of elongation in the range of 27–33.

8. The pneumatic tire of claim 1, wherein a ratio of tie width of said lug groove to the width of said lug is in the range of 0.3–0.8.

9. The pneumatic tire of claim 1, wherein a ratio of the depth of said lug groove to the width of said lug is in the range of 0.2–0.5.

* * * * *